Patented Nov. 9, 1943

2,333,775

UNITED STATES PATENT OFFICE 2,333,775

CONTROL VALVE

Willis H. Gille, St. Paul, Minn., assignor to Minneapolis-Honeywell Regulator Company, Minneapolis, Minn., a corporation of Delaware Application July 8, 1938, Serial No. 218,146

2 Claims. (Cl. 137—153)

My invention relates to automatic control of fluid fuel and is more particularly concerned with diaphragm gas valves of the snap modulating type embodying certain improvements whereby the valve is made unusually flexible in its applicability and adaptability.

Generally my object is to provide the art with an efficient and reliable snap modulating gas control valve of simple construction and capable of accurate control over a wide range of capacities.

Another object is the provision of a diaphragm valve the capacity of which is automatically self-adjusting when additional burners are to be supplied with fuel through the valve.

Another object is the provision of a temperature responsive diaphragm gas valve which modulates the gas flow in accordance with temperature and which is so constructed and arranged as to also act as a pressure regulator for the fluid passing therethrough.

Another object is the provision of a diaphragm type valve having one side of the diaphragm exposed to a thermostatically controlled pressure and the opposite side exposed to outlet pressure of the valve, the arrangement being such that a stable balanced valve is formed which may be automatically adjusted by either the thermostatically controlled pressure or the outlet pressure.

Another object is the provision of a balanced diaphragm valve having a space above the diaphragm connected to the inlet of the valve through a thermostatic pilot valve, the opposite side of the diaphragm being exposed to outlet pressure of the valve and which valve has a small pressure regulator in the connection to the space above the diaphragm ahead of the pilot valve so that the upper side of the diaphragm is not exposed to fluctuations in line pressure whereby the diaphragm valve may act as a pressure regulator for the fluid passing therethrough.

Another object is the provision of a diaphragm gas valve controlled by temperature, the diaphragm being so arranged with respect to the outlet pressure of the valve as to automatically adjust the capacity of the valve upon greater flow demands occasioned by adding more burners to the load being carried by the valve.

Another object is the provision of a diaphragm gas valve having one side of the diaphragm exposed to outlet pressure of the valve and having the other side of the diaphragm exposed to pressure controlled by a thermostatic device, the arrangement being such that upon a change in outlet pressure occasioned by the change in the load to be supplied with fuel by the valve, it will automatically and properly readjust itself to provide the necessary capacity of flow.

Another object of my invention is the provision of a gas valve having a diaphragm associated with the valve disc, the valve disc being adapted to seat by gravity, the diaphragm having a controlled pressure thereover for substantially balancing the weight of the valve disc member and the other side of the diaphragm being exposed to outlet pressure of the valve.

Other objects of my invention will appear and the manner in which the above objects are accomplished will become apparent as the specification proceeds, the invention residing in the improved construction, arrangement of parts, and combinations thereof.

Figure 1:
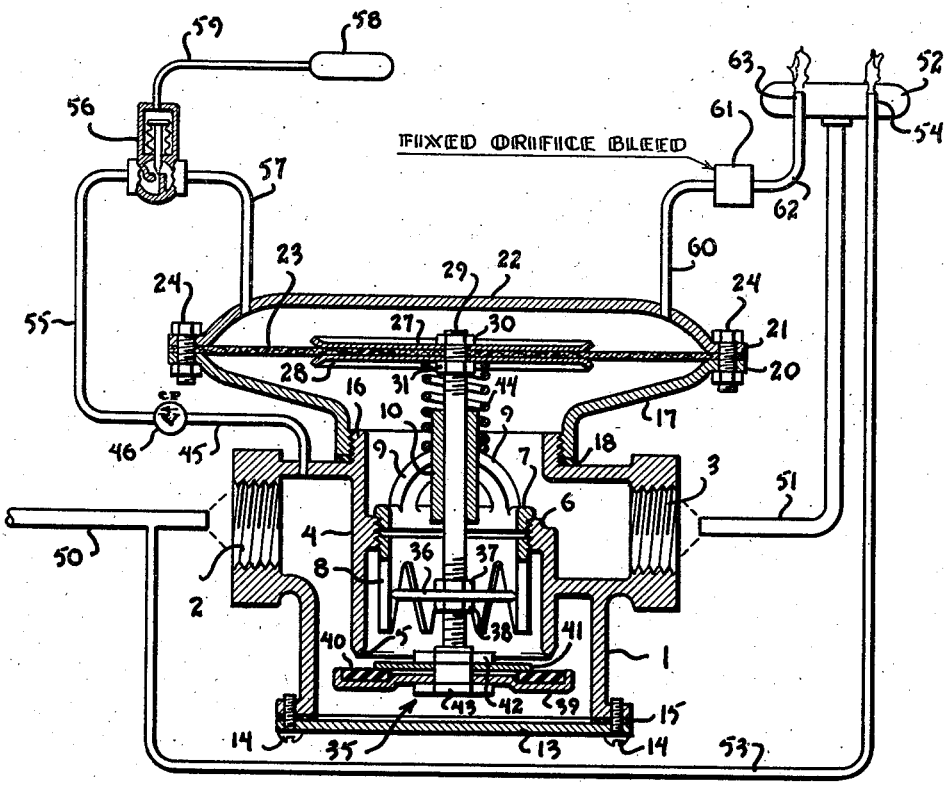
Figure 1 is a cross sectional view of one embodiment of my invention, showing diagrammatically the manner in which the valve may be connected in a gas fired heating system controlled by a thermostat.

Referring to Figure 1 of the drawings, which shows a preferred form of my improved valve, numeral 1 indicates the body of the valve. The inlet of the valve is shown at 2 and the outlet at 3, the inlet and outlet sides of the valve being separated by a dividing member 4 which is cylindrically configurated so as to form a vertical cylindrical passageway through the valve. The lower part of the cylindrical portion 4 forms a valve seat as indicated at 5, and the cylindrical portion 4 is also internally screw-threaded at 6 so as to receive a screw-threaded plug 7. The plug 7 is of general cylindrical conformation having a downwardly extending skirt 8 and having a shoulder adjacent the screw-threaded portion which engages with the screw-threaded part 6 of the dividing member 4. The downwardly extending skirt 8 of the plug 7 has V notches or ports as shown, or in other words, is serrated for throttling purposes which will be described later. The plug 7 includes webs 9 which are integral with a vertical guide 10 for a valve stem which I will refer to later.

The lower part of the body 1 of the valve is open and I provide a cover or diaphragm plate 13 for closing the lower part of the body of the valve, the diaphragm plate being circular and being secured to a flange on the lower part of the body 1 by screws 14, there being a ring or gasket 15 of sealing material interposed between the diaphragm plate and the flange of the valve body 1.

The upper part of the body 1 of the valve comprises a circular screw-threaded portion 16 with which a member 17 forming part of a diaphragm chamber engages in screw-threaded relation, as shown. A ring or gasket 18 of sealing material surrounds the screw-threaded portion 16 of the body 1 and is engaged between the body 1 and the member 17 when the latter member is screwed down upon the screw-threaded portion 16. The gasket 18 provides for a gas-tight seal between the body 1 and the member 17. The member 17 is generally circular and is flanged, as shown at 20, the flange 20 cooperating with a similar flange 21 formed at the edges of a cover plate 22 which also forms a part of a diaphragm chamber. Numeral 23 indicates the diaphragm, its peripheral portions being secured between the flanges 20 and 21 which are secured together by bolts 24. Disposed on opposite sides of the central portion of the diaphragm 23 are metal disc backing members 27 and 28 and extending through these disc members and through the diaphragm is the screw-threaded end of a valve stem 29. The discs 27 and 28 and the diaphragm 23 are held together in their respective relation by nuts 30 and 31 adjacent the discs on opposite sides of the diaphragm, as shown. The valve stem 29 extends downwardly through the guide bearing 10, through the plug 7 and carries at its lower end a valve generally indicated at 35. The valve stem 29 also carries at a point adjacent the V ports in the skirt 8 of plug 7 a throttling disc 36 which is held in position by nuts 37 and 38 on opposite sides of the disc and in screw-threaded relation with the stem 29. The valve generally indicated at 35 comprises a metal disc 39 having an annular recess adjacent its periphery in which is received an annularly shaped ring 40 of some suitable resilient material such as rubber or the like. A disc 41 of smaller diameter than the disc 39 is disposed adjacent the latter disc and its peripheral edges bear against the annular ring 40 so as to retain it in position without interfering with its seating upon the valve seat 5. Th discs 39 and 41 may be held in their respective positions with respect to the valve stem 29 by nuts or the like as indicated at 42 and 43. It will be seen that gravity acting upon the valve 39 and disc 36 tends to pull the stem 29 and the diaphragm downwardly. To balance the weight of the valve and stem assembly, I provide a coil spring 44 which encircles the guide 10 having its lower end abutting upon the webs 9 and having its upper end bearing against the disc backing member 28. The coil spring 44 is of such tensile resiliency as to substantially balance the weight of the valve and stem assembly.

From the foregoing it is apparent that movement of the diaphragm 23 up and down reciprocates the stem 29 and moves the disc 36 vertically with respect to the V ports in the skirt 8 and may seat the valve indicated at 35 upon the seat 5.

My invention is particularly adapted to the control of fluid fuel such as gas for heating purposes or the like. For the purpose of disclosing my invention more completely, I have shown it diagrammatically connected in a heating system controlled by a thermostat. Referring again to Figure 1, numeral 50 indicates a supply pipe which leads to a gas supply main and which may connect to the inlet side of the valve. Numeral 51 indicates a pipe which may be connected to the outlet side of the valve as indicated and which conveys gas to a conventional burner indicated at 52. Numeral 53 is a small pipe connected to the pipe 50 for continuously supplying gas to a constantly burning pilot 54 such as is conventionally used with gas fired heating systems. The space above the diaphragm 23 of my valve is the control chamber and I communicate gas from the inlet side of the valve through a pipe 45, a small pressure regulator 46 and pipe 55 to a thermostatically controlled throttling valve 56 and thence through a pipe 57 to the space above the diaphragm. The pressure regulator 46 prevents fluctuations in pressure in pipe 56 from being felt in the control chamber above diaphragm 23. In other words, the pressure in pipe 55 is held constant by the regulator 46. The throttling valve 56 may take any suitable form of conventional type throttling valve and is controlled by a thermostat comprising a bulb 58 filled with a volatile fluid and communicating with the throttling valve by a capillary tube 59. It will be understood that the bulb 58 is located in a region which is being supplied with heat from the burner 52 and the temperature of which it is desired to be controlled. Inasmuch as the operation of thermostatically controlled valves of conventional type is well known in the art, the operation of the valve 56 in response to the thermostat 58 need not be described in detail. The space above the diaphragm 23 also communicates by a pipe 60 through a fixed orifice bleed indicated at 61 and a pipe 62 with an auxiliary pilot burner 63. The bleed orifice indicated at 61 is of such size that gas may be admitted to the space above the diaphragm through the valve 56 faster than it can be bled off to the auxiliary burner 63. From the drawings, it will be apparent that the space below the diaphragm 23 within the portion 17 of the diaphragm chamber at all times communicates directly with the outlet side of the valve so that outlet pressure is always acting upon the lower side of the diaphragm.

I will now describe the operation of my improved control device. With the parts in the position shown, the pressures above and below the diaphragm are balanced and the valve 35 and disc 36 are positioned so as to permit the passage of a certain amount of gas through the valve and to the burner. The valve 56 is positioned so as to be admitting gas to the space above the diaphragm at the same rate as it is being bled off through the orifice 61 and thus the thermostat 58 is satisfied and the apparatus is in a condition of equilibrium. Now it is important that the lower side of the diaphragm 23 is exposed to pressure on the outlet side of the valve and thus the valve acts in the manner of a pressure regulator, the pressure above the diaphragm being kept constant by pressure regulator 46. Should now for any reason the outlet pressure tend to fluctuate, for example, to rise, the increased pressure will tend to lift the diaphragm, moving the valve disc 36 in a direction tending to close the V ports, thus slightly reducing the flow of gas and tending to bring the pressure back to normal. This operation corresponds to the conventional operation of pressure regulators and will be well understood by those skilled in the art.

Should now there be a slight fall in the temperature in the region to which thermostat 58 is responsive, the valve 56 will be moved slightly in opening direction increasing the amount of gas permitted to flow into the space above the diaphragm. This will cause the pressure to rise slightly in the space above the diaphragm because the constant bleed orifice 61 does not permit it to be bled off as fast as it is being admitted and the valve stem 29 will be moved downwardly so as to cause the disc 36 to uncover a greater area of the V ports in the skirt 8 until the pressures on opposite sides of the diaphragm are rebalanced. Thus the volume of gas being passed through the valve will be increased so as to increase the heating and cause the temperature to return to its original value. It will thus be seen that the valve operates in a throttling manner and responds to temperature so as to maintain the temperature at a predetermined desired value for which the valve and thermostat may be adjusted.

An important feature of my invention resides in that should I desire to supply more than one burner, for example a bank of burners, from a single valve I may do so and the valve will automatically adjust itself for the increased flow capacity necessary. For example, if I should subsequently connect a second burner to the outlet of my valve in addition to the one shown in the drawings, there would be a suddent drop in outlet pressure in the valve. This will cause the diaphragm 23 to drop downwardly somewhat moving the valve disc 36 in opening direction in the same manner as a pressure regulator responds to a change in pressure. The increased valve opening will now permit a greater flow rate sufficient to accommodate the additional burner or burners which have been connected. The increased flow rate of gas will build up the outlet pressure to substantially its previous value at which the pressure underneath the diaphragm will again balance the pressure above the diaphragm with the diaphragm in a new position which it assumed upon the cutting in of the additional burner or burners and the ensuing increase in the flow rate through the valve. It will be thus seen that for any flow capacity at which I desire to operate, my valve will automatically assume a corresponding correct position and at any such position will automatically act as a pressure regulator to regulate the pressure and also at any position and at all times it is automatically responsive to the thermostat for controlling the flow accordingly. It should be apparent to those skilled in the art from the above that I have combined a relatively large number of desirable functions which are all automatic in nature in a single control valve of a relatively simple, reliable and compact construction and that therefore I accomplish the necessary control results in gas fired heating systems with a minimum of apparatus and without the necessity of any manual adjustments for changes in load or the like.

Upon opening and closing, my valve operates with a snap movement. For example, upon the occurrence of a predetermined temperature adjacent the bulb 58 at which the valve is set to open, the pressure above the diaphragm 23 will have increased to a value just sufficient to move the valve 35 away from the seat 5. As soon as the seal between member 40 and the seat 5 is broken, pressure will enter within the portion 4 and will be exerted upon the valve 35, and this additional pressure acting downwardly will create an additional increment of force acting upon the valve 35 sufficient to snap it downwardly from its seat in a manner well understood in the art. As soon as the valve snaps open in this manner, gas will pass through the valve and the lower side of the diaphragm 23 will be affected by the outlet pressure of the gas. This outlet pressure will quickly build up and by reason of its force against the lower side of the diaphragm 23 the amount of snap movement of the valve upon opening will be limited. It will be seen, therefore, that in my valve I need provide no mechanism for the purpose of limiting the amount of its opening upon the initial snap movement. Upon closing, my valve operates similarly in snapping from a minimum open position to fully closed. As soon as the member 40 approaches sufficiently close to the seat 5 to substantially reduce the flow of gas therethrough, the reduction of pressure on the disc 41 will cause a sudden overbalancing by the pressure acting on disc 39 which will snap the valve to its seat.

The amount of gas which passes through my valve when it is in its minimum open position, that is, just before snapping shut may be readily adjusted by means of changing the position of the disc 36 with respect to the valve stem 29. It will be understood that when the valve 35 is in a position just prior to snapping against the seat 5, the disc 36 will be in a position with respect to the V ports in the skirt 8 permitting the minimum amount of gas to pass through the uncovered portion of the V ports. Obviously, by loosening either of the nuts 37 or 38 and adjusting the disc 36 longitudinally with respect to the stem 29, this minimum amount of flow opening may be easily and accurately adjusted.

It is customary when employing valves of the type which I disclose to use a pressure regulator in the conduit 50 so that fluid fuel at a constant pressure may be supplied to the control valve. The purpose of this pressure regulator is, of course, to prevent any fluctuations in line pressure from exerting an undesirable control effect upon the control valve. By reason of the small pressure regulator 46 which I use the need of the conventional pressure regulator in pipe 50 is obviated.

Figure 2:
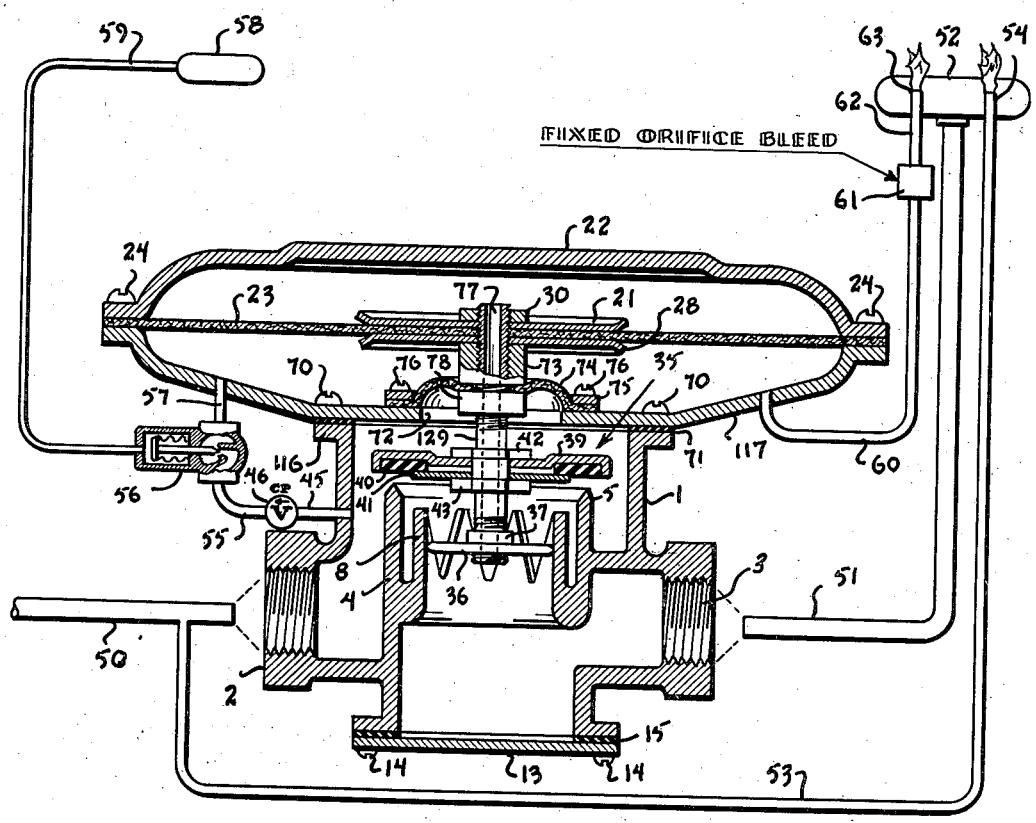
Figure 2 is a view similar to that of Figure 1 of a modification of my invention.

Referring to Figure 2, I have shown a somewhat modified form of my invention in which I have arranged the parts so that the valve 35 seats by gravity. All those parts of the valve of Figure 2 which are the same as and correspond to similar parts of Figure 1 are numbered the same and need not be described again. Those parts of the valve 2 which are different from but correspond to similar parts shown in Figure 1 are numbered 100 greater. It will be seen that in Figure 2 the body of the valve has a flange 116 which is secured to the flat bottom portion of the member 117 by screws 70, there being a ring shaped gasket 71 interposed between the flange 116 and the member 117 so as to form a gas tight seal. The flat bottom portion of member 117 has a circular center opening 72 through which the valve stem extends. The valve stem has a collar 73 of larger diameter adjacent the diaphragm 23 and sealed between this collar 73 and a similar collar 78 is the center portion of a smaller auxiliary diaphragm 74. The peripheral portions of the diaphragm 74 are secured to the edge portions of the bottom of member 117 which surround the opening 72 by a metal ring 75 secured in place by screws 76. It will be seen that in Figure 2, the dividing member 4 within the body of the valve is reversed in position so that the skirt 8 extends upwardly and the valve seat 5 engages the valve 35 upon a downward movement thereof. Also the valve 35 and valve disc 36 have their positions reversed on the stem 129.

The stem 129 has a longitudinal opening 77 extending therethrough which provides for communication of gas from the outlet side of the valve to the space above the diaphragm 23. It will therefore be seen that in Figure 2 the pressure control chamber, that is the chamber containing the pressure controlled by the thermostat, is below the diaphragm and it is the upper side of the diaphragm which is exposed to the outlet pressure of the valve. Inasmuch as the valve now seats in the opposite direction, it is obvious that the pressures on opposite sides of the diaphragm have the same relative effect as far as positioning the valve is concerned as they do in the structure of Figure 1. It is pointed out that in the device of Figure 2 should there be a failure of the means employed for controlling the pressure underneath the diaphragm or in the event of any type of failure of the valve actuating means, the valve 35 will drop upon its seat due to gravity and the valve will therefore have failed in a safe manner inasmuch as the flow of gas will be stopped. The operation of the valve in Figure 2 is substantially the same as the operation of the valve of Figure 1, the thermostat controlling the pressure underneath the diaphragm so as to modulate the valve in accordance with temperature. As has already been stated, the direction of closing movement of the valve has been reversed and the pressures affecting the diaphragm have also been reversed as respects the opposite sides of the diaphragm so that the description of operation need not be again repeated.

From the foregoing the manifold advantages and desirable results which have been gained by my particular construction and arrangement should be apparent to those skilled in the art. I accomplish automatic adjustment of the valve for different flow capacities by a relatively simple and reliable arrangement while at the same time providing for automatic regulation of pressure and modulating control of the flow through the valve. My device therefore embodies novel and useful features which render it widely adaptable and which enable those practicing my invention to secure satisfactory control results with a minimum of apparatus and attention by operatives.

While I have disclosed two of the preferred forms which my invention may take, there are numerous modifications, variations and forms which will occur to those skilled in the art but which are intended to fall within the scope of the invention. I therefore intend that my invention shall be limited only as determined by the appended claims.

I claim as my invention:

1. A combination pressure regulator and shut-off device comprising a valve casing having an inlet chamber, an outlet chamber, and a passageway connecting the two, said passageway having two concentric spaced walls, the inner of which is provided with configurated ports and the outer of which terminates at the inlet end of the passageway in a valve seat, a shut-off valve in said inlet chamber adapted to close against said valve seat, a throttling valve movable within the inner wall and throttling the flow through the ports of said passageway, a movable diaphragm, means connecting said shut-off valve and said throttling valve to said diaphragm with said shut-off valve and said throttling valve spaced apart to provide an intermediate chamber between said shut-off and throttling valves, said diaphragm being subject on one side to the pressure in said outlet chamber and actuating said throttling valve to maintain a regulated pressure therein, and means for varying the force exerted on the opposite side of said diaphragm for adjusting the pressure maintained by said throttling valve, said shut-off valve having a large area relative to said configurated ports so as to move with a snap action from between closed and a minimum open position because of a change in the pressure differential to which it is subjected.

2. A combination pressure regulator and shut off valve comprising a valve casing having an inlet chamber, an outlet chamber, and a passageway connecting the two, a diaphragm sealing said outlet chamber and responsive to the pressure therein, a valve seat at the inlet end of said passageway, throttling ports in said passageway, a main valve cooperating with said valve seat, a throttling valve movable within the passageway and cooperating with said ports, said throttling valve and ports being so constructed and arranged that the movement of the throttling valve is substantially unaffected by flow through the ports, a valve stem carried by said diaphragm, said valves being independently mounted on said stem, increase in outlet pressure causing the diaphragm to move said throttling valve to decrease the flow through said ports whereby a regulated outlet pressure is maintained, means for varying the pressure on the opposite side of said diaphragm to control the said regulated pressure, the area of said main valve being so large with respect to said ports that it has no throttling effect on the flow through the ports except when it is between a fully closed and a predetermined minimum open position between which the valve moves with a snap action by reason of the differential in pressure exerted upon the opposite sides of the said main valve, and means for adjusting said throttling valve with respect to said main valve whereby the minimum position of said main valve is varied.

WILLIS H. GILLE.